United States Patent [19]

Szucs et al.

[11] Patent Number: 4,538,688
[45] Date of Patent: Sep. 3, 1985

[54] FLUTED COULTER BLADE

[75] Inventors: Robert J. Szucs, Midlothian; Sandra M. McNicholas, Riverdale, both of Ill.

[73] Assignee: Ingersoll Products Corp., Chicago, Ill.

[21] Appl. No.: 585,378

[22] Filed: Mar. 2, 1984

[51] Int. Cl.³ .............................................. A01B 15/16
[52] U.S. Cl. ...................................... 172/555; 172/604
[58] Field of Search ....................... 172/604, 555, 557; 301/64 SD

[56] References Cited

U.S. PATENT DOCUMENTS

| | | |
|---|---|---|
| 323,343 | 7/1885 | La Dow . |
| 323,344 | 7/1885 | La Dow . |
| 809,888 | 1/1906 | Avery . |
| 1,058,140 | 4/1913 | Beene . |
| 1,131,883 | 3/1915 | Williams ........................ 301/64 SD |
| 1,411,196 | 3/1922 | Smith . |
| 1,450,618 | 4/1923 | Swain ............................ 301/64 SD |
| 1,484,535 | 2/1924 | Shepard ......................... 301/64 SD |
| 1,697,796 | 1/1929 | Swain ............................ 301/64 SD |
| 1,879,193 | 9/1932 | Graham ............................. 172/557 |
| 2,908,338 | 10/1959 | Hanrahan . |
| 3,122,111 | 2/1964 | Taylor ................................ 111/80 |
| 3,237,577 | 3/1966 | Wilkins ......................... 172/555 X |
| 3,559,748 | 2/1971 | Shelton ............................. 172/604 |
| 3,752,238 | 8/1973 | Chilton ............................. 172/604 |
| 3,806,379 | 4/1974 | Darr ................................. 172/604 |
| 4,070,974 | 1/1978 | Stacy .................................. 111/85 |
| 4,099,576 | 7/1978 | Jilani ................................ 172/555 |

FOREIGN PATENT DOCUMENTS

| | | | |
|---|---|---|---|
| 825926 | 10/1969 | Canada ............................. 172/604 |
| 1272610 | 7/1968 | Fed. Rep. of Germany ...... 172/604 |

OTHER PUBLICATIONS

Avco New Idea Single Frame Planters–Advertising Brochure of Avco New Idea, Coldwater, Ohio, 1/1983.
Tye NoTills–Advertising Brochure of the Tye Co. Lockney, TX, 7–1982.

Primary Examiner—Richard J. Johnson
Attorney, Agent, or Firm—Evan D. Roberts

[57] ABSTRACT

Disclosed herein is a fluted coulter disc blade with a circumferential cutting edge portion, flutes circumferentially spaced apart around the disc and having a radially and axially tapered configuration, notches in the peripheral cutting edge portion, and circumferential openings through the flutes.

29 Claims, 36 Drawing Figures

FLUTED COULTER BLADE

SUMMARY OF THE INVENTION

This invention provides an improved coulter blade disc wherein the disc has a tapered cutting edge portion around the periphery thereof and, as an alternative, having notches in the cutting edge portion spaced apart circumferentially therearound and having a circumferential dimension substantially greater than the radial depth thereof.

Flutes are provided in circumferentially spaced apart arrangement around the plate of the disc, and are radially elongated and positioned inwardly from the cutting edge portion. The flutes are further axially and circumferentially tapered along the length thereof.

Existing types of coulter discs provide various structures, and the one which may be considered the most desirable includes circumferentially adjacent uniform flutes that extend radially inwardly from the outer periphery thereof. This structure provides a corrugated axially alternate cutting edge around the periphery of the disc. The corrugations provides a means whereby the disc will react with the earth to rotate with the earth as the coulter is moved into engagement therewith.

Problems occur when existing coulter blades are utilized, particularly with the more modern agricultural practices requiring a deep penetration with higher speed tillage practices. The fluted corrugation extending inwardly from the peripheral cutting edge provides an enlarged cutting contact with the soil. This results in a reduced pressure reaction between the coulter blade and the soil which resists penetration of the coulter into the soil, and accordingly, less penetration and reaction of the flutes with the soil, all of which diminishes the effectiveness of the coulter for soil penetration and soil working from the cutting edge and flutes in combination and respectively.

It is, therefore, highly desirable to provide a fluted coulter disc in an improved form whereby a substantially circular independent cutting edge is provided radially exterior of the flutes to provide highly desirable penetration, without the diminishing effect from the flutes, while providing soil handling by the flutes as deeper penetration is accomplished. In this regard, it is further highly desirable to provide flutes which will enhance the ability of the coulter to penetrate, and yet, provide sufficient working of the soil by the reaction of the flutes therewith.

It is a further advantageous object of a coulter to provide a varied or selectively controlled penetration and working of the soil by providing a coulter disc which, when mounted for operation in one direction relative to the soil, will provide greater penetration and soil working than when the same blade is mounted axially oppositely with respect to the engagement of the coulter with respect to the soil to provide reduced penetration and/or soil working as the soil may require, all from a single coulter construction.

It is a further object of this invention to provide a coulter with a soil engaging cutting edge which will have an improved and more efficient soil residue cutting ability, with less tendency to become clogged by operation.

An additional object of this invention is to provide an improved coulter disc which, while improving the penetration and soil working characteristics, further enhances the soil working characteristics by the relieving or opening of passageways in the flutes thereof.

Other advantages and/or novel aspects of the invention will become apparent upon consideration of the following detailed description in conjunction with the accompanying drawings wherein.

Figure 1:
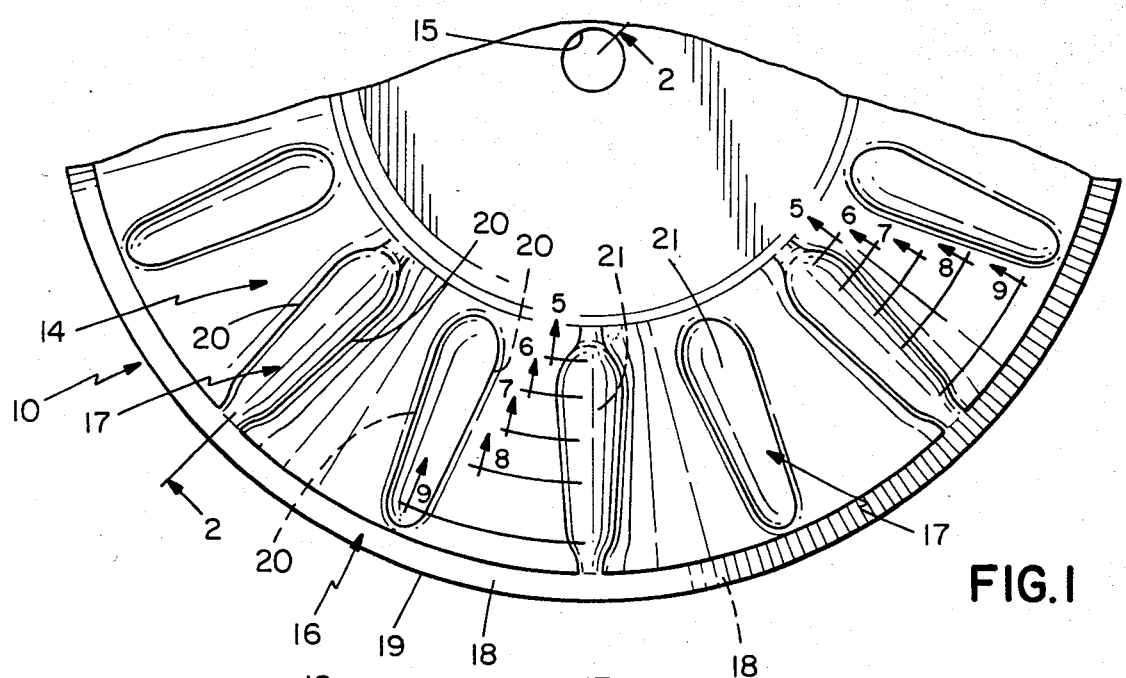
FIG. 1 is a partial plan view of a first embodiment of the improved coulter disc of this invention showing the spaced apart flute positionment and tapered flute configuration, radially inwardly of a cutting edge portion of the first embodiment of this invention.
Figure 2:
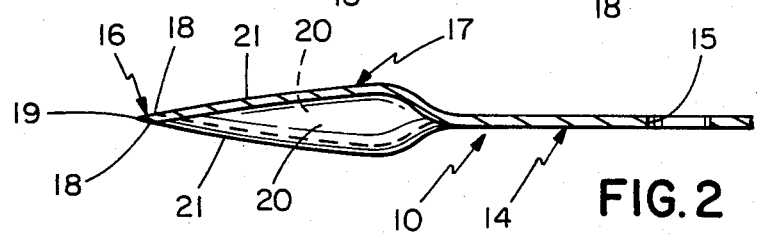
FIG. 2 is a partial sectional view taken along line 2—2 of FIG. 1 of the embodiment of the invention illustrated in FIG. 1 showing the axially tapered configuration of the flutes positioned radially inwardly from the cutting edge portion thereof.
Figure 3:
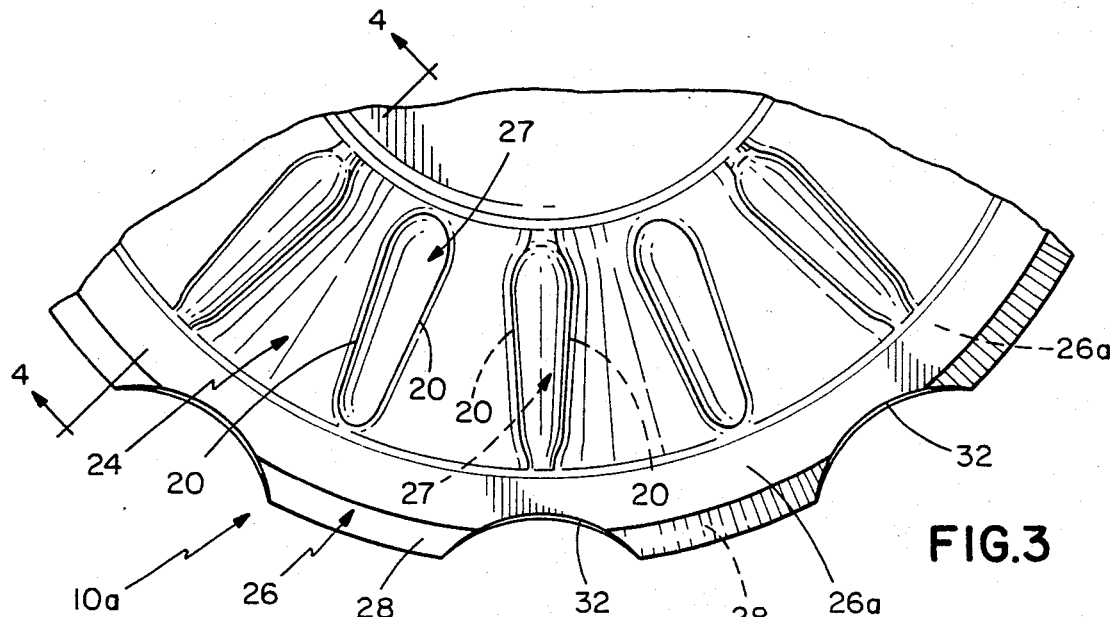
FIG. 3 is a partial plan view of the improved coulter disc of this invention showing a variation of the first embodiment of this invention with the identical flutes thereof radially spaced inwardly and apart from the cutting edge portion, and showing the wide and shallow notches through the cutting edge portion.
Figure 4:
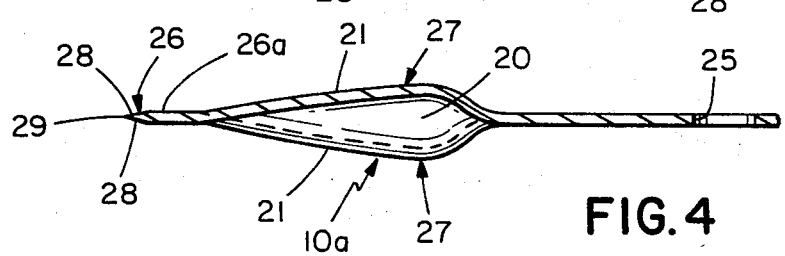
FIG. 4 is a partial section view taken along line 4—4 of FIG. 3 of the embodiment of the invention shown in FIG. 3 illustrating the axially tapered configuration of the flutes positioned radially inwardly from the cutting edge portion thereof.
Figure 5:
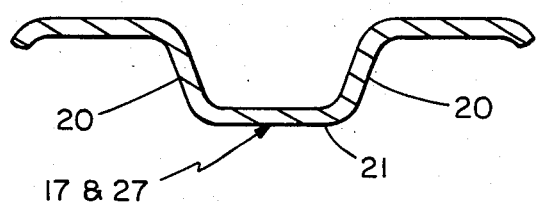
FIG. 5 is a sectional view taken along line 5—5 of FIG. 1 showing the largest axial dimension of the flutes of the first embodiment of this invention.
Figure 6:
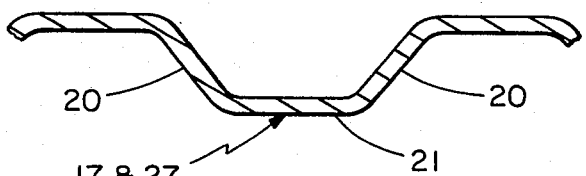
FIG. 6 is a sectional view taken along line 6—6 of FIG. 1 showing the initial axially tapered dimension and circumferentially largest dimension of the flutes of the first embodiment of this invention.
Figure 7:
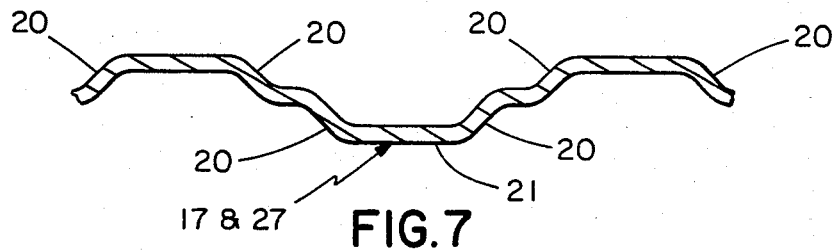
FIG. 7 is a sectional view taken along line 7—7 of FIG. 1 showing a further axially tapered dimension of the flutes of the first embodiment of this invention.
Figure 8:
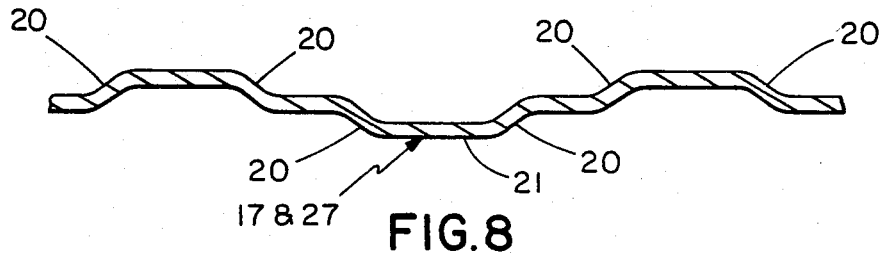
FIG. 8 is a sectional view taken along line 8—8 of FIG. 1 showing a further axially tapered dimension of the flutes of the first embodiment of this invention.
Figure 9:
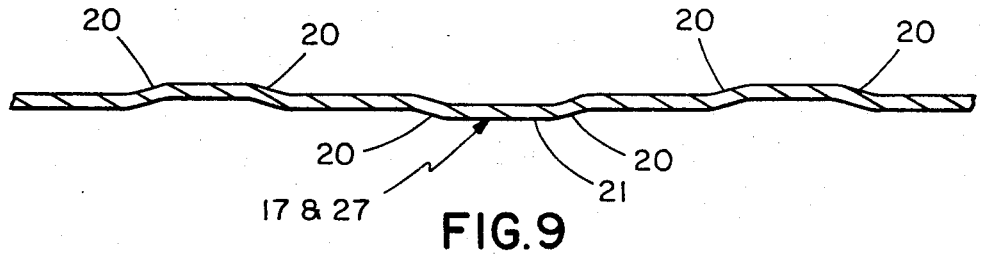
FIG. 9 is a sectional view taken along line 9—9 of FIG. 1 showing a further axially tapered dimension and smallest circumferential dimension of the flutes of the first embodiment of this invention and radially immediately inward from the termination of said flutes adjacent, or spaced inwardly from, the cutting edge portion of the coulter blade.

An improved coulter blade disc is shown herein for the purpose of illustrating the invention, and includes four general illustrative embodiments, with variations, generally designated by the numerals 10, 10a, 11, 11a, 12, 12a, 13 and 13a respectively.

All embodiments 10-13 of this invention, and the variations thereof, are provided with a designated disc blade body, center opening, peripheral cutting edge portion and flutes. The center opening is provided so that the disc can be rotatably mounted in a conventional manner on the arm or beam of a plow, row-crop planters, grain drills or similar ground working equipment (not shown). The disc will thereby be caused to rotatably engage the ground to penetrate the ground, whereby the ground will be opened and worked to a desired extent by the unique structures and configurations of the coulter disc of this invention as hereinafter described and claimed.

Although the improved coulter disc 10-13 of this invention is illustrated herein by a generally flat structure for purposes of clarity, it is to be understood that the invention could apply to a dished or otherwise concavo-convex structure without deviating from the scope thereof.

Disc 10 (FIGS. 1, 2 and 5–9) of the first embodiment of this invention, is generally provided with a disc plate body 14, a center opening 15, a peripheral cutting edge portion 16 and flutes 17. Cutting edge portion 16 is radially tapered by surfaces 18 to provide a cutting edge 19. Flutes 17 are serially provided, circumferentially spaced apart, and alternately circumferentially on opposite sides of body 14 of plate 10.

Each flute 17 (FIGS. 1, 2 and 5–9) is further radially elongated and positioned entirely inwardly of cutting edge portion 16. Flutes 17 have circumferential sides 20 which are gradually axially tapered together in a taper range of 14 to 21 degrees and radially outwardly (FIGS. 1 and 5–9) toward cutting edge portion 16 (FIG. 1), and axial surface 21 axially tapered radially outwardly to narrow flutes 27 toward cutting edge portion 16, (FIGS. 2 and 5–9).

Disc 10a (FIGS. 3–9) is a variation of the first embodiment of this invention, and is generally provided with a disc plate body 24, a center opening 25, a peripheral cutting edge portion 26 and flutes 27. Cutting edge portion 26 is radially tapered by surfaces 28 to provide a cutting edge 29. Flutes 27 (FIGS. 3–9) are serially provided, circumferentially spaced apart, and alternately circumferentially on opposite sides of body 24 of plate 10a.

Each flute 27 of disc 10a (FIGS. 3–9) is further radially elongated and positioned, and is spaced inwardly of cutting edge portion 26. Flutes 27 have the circumferential sides 20 gradually axially tapered together in a taper range of 14 to 21 degrees and radially outwardly toward cutting edge portion 26 (FIGS. 3 and 6–9), and have the axial surface 21 axially tapered radially outwardly to narrow flutes 27 toward cutting edge portion 26 (FIGS. 4–9).

Shallow notches 32 (FIG. 3) with sharpened concave edges 33 are provided in cutting edge portion 28 and body 24 and have a circumferential length to radial depth ratio of 3:1 or greater. Notches 32 are circumferentially spaced apart around the periphery of disc 10a at a peripheral spacing distance no less than the peripheral length of notches 32.

Disc 11 (FIGS. 10, 11 and 14–18) of the second embodiment of this invention, is generally provided with a disc plate body 34, a center opening 35, a peripheral cutting edge portion 36 and flutes 37. Cutting edge portion 36 is radially tapered by surfaces 38 to provide a cutting edge 39. Flutes 37 are serially provided, circumferentially spaced apart, and alternately circumferentially on opposite sides of body 34 of plate 11.

Each flute 37 (FIGS. 10, 11 and 14–18) is generally arcuately shaped to be elongated serially and circumferentially and positioned entirely inwardly of cutting edge portion 36. Flutes 37 have circumferential convex outer sides 40, and inner concave sides 40a, which are gradually axially tapered together in a taper range of 14 to 12 degrees and radially and circumferentially outwardly along the arcuate length of flutes 37 (FIGS. 10 and 15–18) toward cutting edge portion 36, and axial surfaces 41 are axially tapered radially outwardly to narrow flutes 37 toward cutting edge portion 26 (FIGS. 11 and 14–18).

Disc 11a (FIGS. 12–18) is a variation of the second embodiment of this invention, and is generally provided with a disc plate body 44, a center opening 45, a peripheral cutting edge portion 46 and flutes 47. Cutting edge portion 35 is radially tapered by surfaces 48 to provide a cutting edge 49. Flutes 47 are serially provided, circumferentially spaced apart, and alternately circumferentially on opposite sides of body 44 of plate 11a.

Each flute 37 of disc 11a (FIGS. 12–18) is generally arcuately shaped to be elongated radially and circumferentially, and is positioned and spaced inwardly of cutting edge portion 36. Flutes 37 have the circumferential convex outer sides 40 and concave inner sides 40a which are gradually axially tapered together in a taper range of 14 to 21 degrees and radially and circumferentially outwardly along the arcuate length of flutes 47 (FIGS. 12 and 15–18) toward cutting edge portion 46. Axial surfaces 41 and 41a are axially tapered radially and circumferentially together outwardly to narrow flutes 37 toward cutting edge portion 46 (FIGS. 13–18).

Shallow notches 52 (FIG. 12) with sharpened concave edges 33 are provided in cutting edge portion 48 and body 44, and have a circumferential length to radial depth ratio of 3:1 or greater. Notches 52 are circumferentially spaced apart around the periphery of disc 11a at a peripheral spacing distance no less than the peripheral length of notches 52.

Disc 12 (FIGS. 19, 20 and 23–27) of the third embodiment of this invention, is generally provided with a disc plate body 54, a center opening 55, a peripheral cutting edge portion 56 and flutes 57. Cutting edge portion 56 is radially tapered by surfaces 58 to provide a cutting edge 59. Flutes 57 are serially provided, circumferentially spaced apart, and alternately circumferentially on opposite sides of body plate 54.

Each flute 57 (FIGS. 19, 20 and 23–27) is further radially elongated and positioned entirely inwardly of cutting edge portion 56. Flutes 57 have circumferential sides 60 which are very gradually axially tapered together in a taper range of 14 to 21 degrees and radially outwardly (FIGS. 19 and 23–27) toward cutting edge portion 56 (FIG. 19), and axial surface 61 axially tapered radially outwardly to narror flutes 57 toward cutting edge portion 56 (FIGS. 20 and 23–27).

Disc 12a (FIGS. 21–27) is a variation of the third embodiment of this invention, and is generally provided with a disc plate body 64, a center opening 65, a peripheral cutting edge portion 66 and flutes 67. Cutting edge portion 66 is radially tapered by surfaces 68 to provide a cutting edge 69. Flutes 67 are serially provided, circumferentially spaced apart, and alternately circumferentially on opposite sides of body 64 of plate 12a.

Each flute 67 of disc 12a (FIGS. 21–27) is further radially elongated and positioned, and is spaced inwardly of cutting edge portion 66. Flutes 67 have the circumferential sides 60 gradually axially tapered together in a taper range of 14 to 21 degrees and radially outwardly toward cutting edge portion 66 (FIGS. 21 and 23–27), and have the axial surface 61 axially tapered radially outwardly to narrow flutes 67 toward cutting edge portion 66 (FIGS. 22–27).

Shallow notches 72 (FIGS. 21) with sharpened concave edges 73 are provided in cutting edge portion 68 and body 64 and have a circumferential length to radial depth ratio of 3:1 or greater. Notches 62 are circumferentially spaced apart around the periphery of disc 12a at a peripheral spacing distance no less than the peripheral length of notches 62.

Disc 13 (FIGS. 28, 29 and 32–36) of the fourth embodiment of this invention, is generally provided with a disc plate body 74, a center opening 75, a peripheral cutting edge portion 76 and flutes 77. Cutting edge portion 76 is radially tapered by surfaces 78 to provide a cutting edge 79. Flutes 77 are serially provided, circumferentially spaced apart, and alternately circumferentially on opposite sides of body plate 74.

Each flute 77 (FIGS. 28, 29 and 32–36) is further radially elongated and positioned entirely inwardly of cutting edge portion 76. Flutes 77 are circumferential sides 80 which are very gradually axially tapered together in a taper range of 14 to 12 degrees and radially outwardly (FIGS. 28 and 32–36) toward cutting edge portion 76 (FIGS. 28), and axial surface 71 axially tapered radially outwardly to narrow flutes 77 toward cutting edge portion 76 (FIGS. 31–36). Radially elongated openings 83 are provided through flutes 87 in the tapered or inclined side surfaces 80.

Disc 13a (FIGS. 30–36) is a variation of the fourth embodiment of this invention, and is generally provided with a disc plate body 84, a center opening 85, a peripheral cutting edge portion 86 and flutes 87. Cutting edge portion 86 is radially tapered by surfaces 88 to provide a cutting edge 89. Flutes 87 are serially provided, circumferentially spaced apart, and alternately circumferentially on opposite sides of body 74 of plate 13a.

Each flute 87 of disc 13a (FIGS. 30–36) is further radially elongated and positioned, and is spaced inwardly of cutting edge portion 86. Flutes 87 have the circumferential sides 70 gradually axially tapered together in a taper range of 14 to 21 degrees and radially outwardly toward cutting edge portion 86 (FIGS. 30 and 32–36), and have the axial surface 71 axially tapered radially outwardly to narrow flutes 87 toward cutting edge portion 86 (FIGS. 31–36).

Shallow notches 63a (FIG. 30) with sharpened concave edges are provided in cutting edge portion 88 and body 84 and have a circumferential length to radial depth ratio of 3:1 or greater. Notches 63a are circumferentially spaced apart around the periphery of disc 13a at a peripheral spacing distance no less than the peripheral length of notches 63a. Radially elongated openings 83 are provided through flutes 87 in the tapered or inclined side surfaces 80.

In operation, the coulter disc of this invention such as 14 (FIG. 1), is forced against the soil of the earth whereby the cutting edge of cutting edge portion radially penetrates the soil to provide an opening for receiving the larger or axially wider portion of coulter disc. As the coulter disc is thus forced and accepted into the earth, flutes such as 17, will engage the soil to cause the disc to rotate on its center opening axis and to work the soil.

All of the embodiments of this invention have a narrowed axial dimension outwardly from the center to a peripheral cutting edge such as 19 (FIG. 1). This narrowed structure allows greater penetration of the disc into lower soil depths at higher speeds of movement of the disc relative to the soil, and with less downward weight force required with respect thereto. The greater soil penetration provides an improved root zone penetration and greater access to lower soil moisture, while the tapered penetration allows soil movement at the upper or shallower soil levels without unduly widening the furrows in this same upper or shallower soil levels.

The flutes such as 17 provide an axial or horizontal working of the soil while providing a rotational engagement with the soil to cause the disc to be rotated as it penetrates the soil, and thereby, more readily penetrates the soil and surface residue or trash.

The shallow notches such as 32 (FIG. 3) further enhance the residue cutting ability of the coulter blade by providing a means for receiving trash or residue to cut the residue into the soil. It should be noted that these notches differ from presently used notches of coulter blades by being shallower. In operation, the more shallow notches provide easier entrance and exit of the trash, and thereby, significantly tend to preclude problems with clogging of the coulter. Further, notches such as 32 are sharpened whereby the actual cutting periphery of the blades is increased by virtue of the notch.

In the operation of the embodiments or versions wherein the flutes such as 27 (FIG. 3) are positioned inwardly from a cutting surface such as 28, rather than immediately radially inwardly from the cutting surface, such as flutes 17 (FIG. 1), the flutes provide an even more gradual or less drastic change in axial profile, as the disc penetrates the soil, to even further increase the cutting action of the disc blade.

Also, in operation, the curved flute configuration such as provided by flutes 37–47 (FIGS. 10 and 12) provides a greater option for selective degree of soil working. In particular, if the disc 11 is mounted to be rotated counterclockwise by leftward movement thereof (FIGS. 10 and 12), the curved flute configuration 37 and 47 would provide a direct soil penetration for the coulter blade inasmuch as the small outer peripheral end of the flutes 37 would engage the soil in a more direct downward insertion action for penetration of the flutes.

Figure 10:
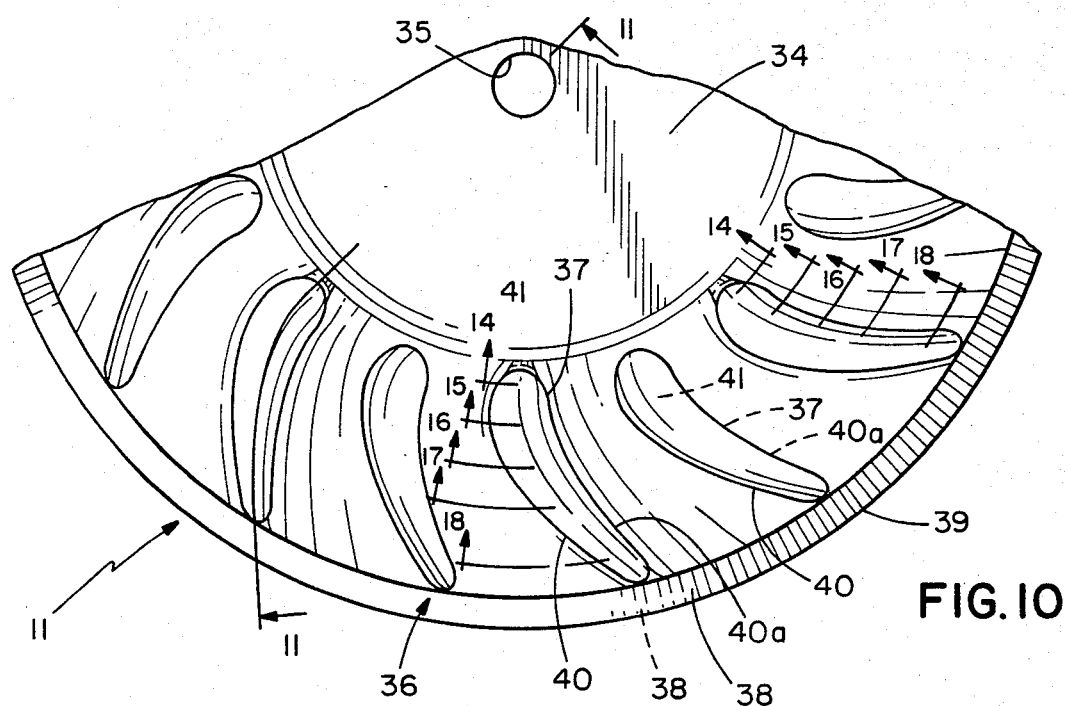
FIG. 10 is a partial plan view of a second embodiment of the improved coulter disc of this invention showing arcuate shaped flutes in the spaced apart flute positionment and tapered flute configuration, radially inwardly of a cutting edge portion of the first embodiment of this invention.
Figure 11:
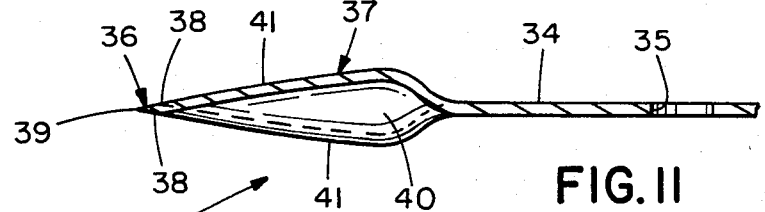
FIG. 11 is a partial sectional view taken along line 11—11 of FIG. 1 of the embodiment of the invention illustrated in FIG. 10 showing the axially tapered configuration of the arcuate flutes positioned radially inwardly from the cutting edge portion thereof.
Figure 12:
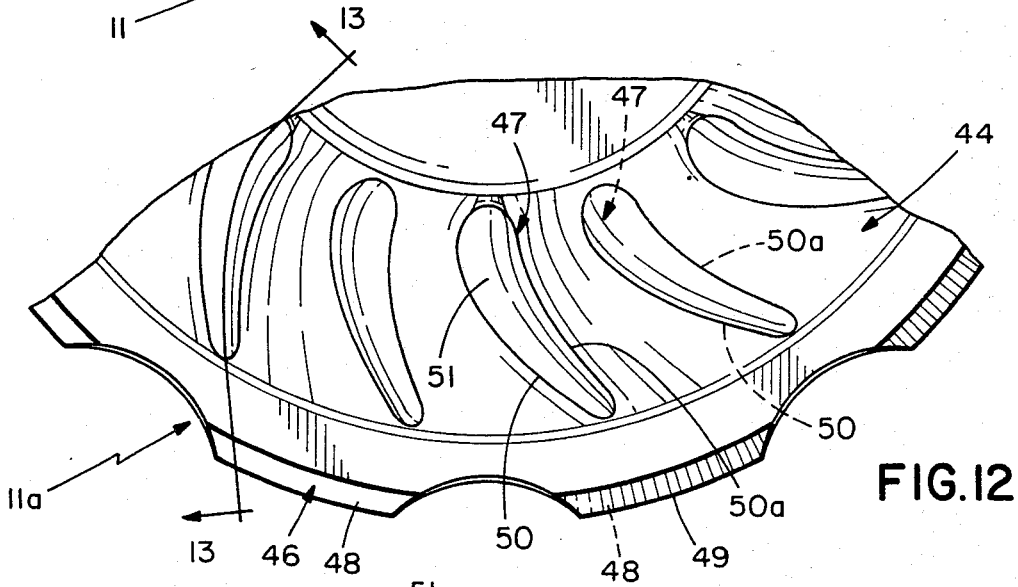
FIG. 12 is a partial plan view of the improved coulter disc of this invention showing a variation of the second embodiment of this invention with the identical arcuate flutes thereof radially spaced inwardly and apart from the cutting edge portion, and showing the wide and shallow sharpened notches through the cutting edge portion.
Figure 13:
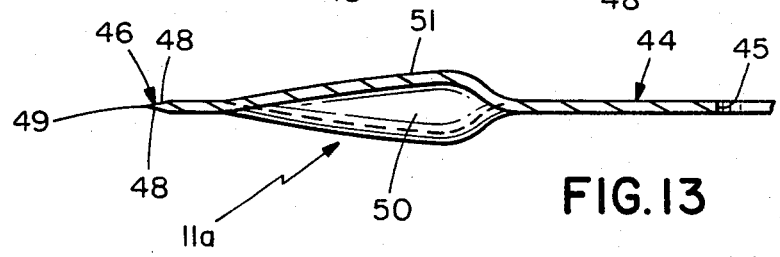
FIG. 13 is a partial section view taken along line 13—13 of FIG. 12 of the embodiment of the invention shown in FIG. 12 illustrating the axially tapered configuration of the arcuate flutes positioned radially inwardly from the cutting edge portion thereof.
Figure 14:
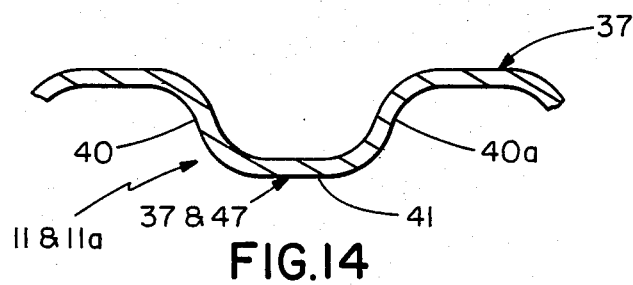
FIG. 14 is a sectional view taken along line 14—14 of FIG. 10 showing the largest axial dimension of the flutes of the second embodiment of this invention.
Figure 15:
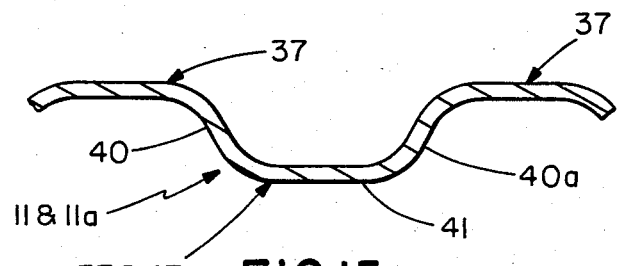
FIG. 15 is a sectional view taken along line 15—15 of FIG. 10 showing the initial axially tapered dimension and circumferentially largest dimension of the arcuate flutes of the second embodiment of this invention.
Figure 16:
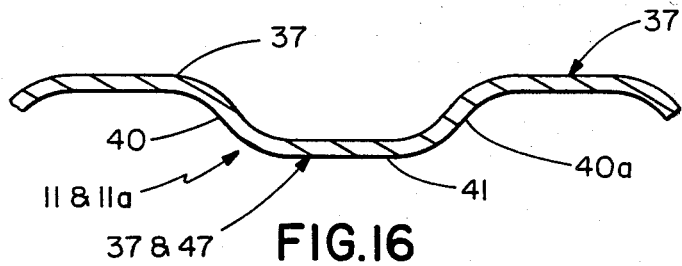
FIG. 16 is a sectional view taken along line 16—16 of FIG. 10 showing a further axially tapered dimension of the arcuate flutes of the second embodiment of this invention.
Figure 17:
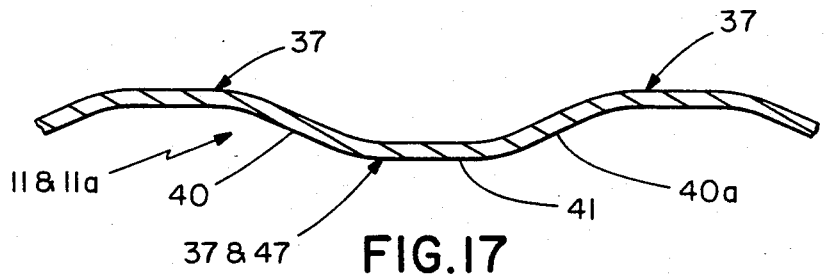
FIG. 17 is a sectional view taken along line 17—17 of FIG. 10 showing a further axially tapered dimension of the arcuate flutes of the second embodiment of this invention.
Figure 18:
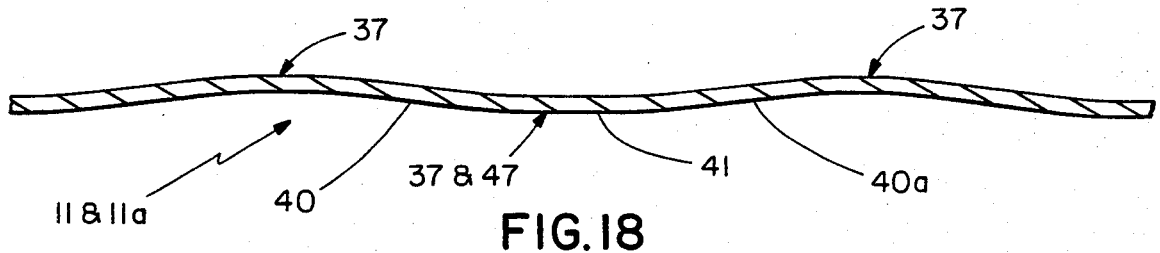
FIG. 18 is a sectional view taken along line 18—18 of FIG. 10 showing a further axially tapered dimension and smallest circumferential dimension of the arcuate flutes of the second embodiment of this invention and radially immediately inward from the termination of the flutes spaced inwardly from the cutting edge portion of the coulter blade.
Figure 19:
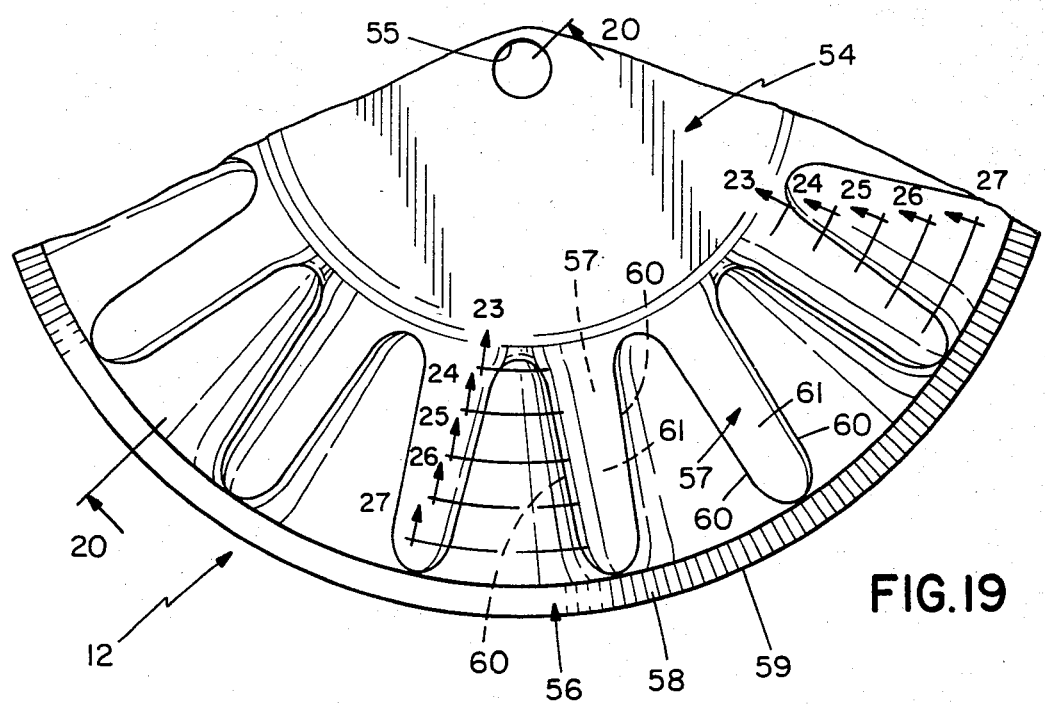
FIG. 19 is a partial plan view of a third embodiment of the improved coulter disc of this invention showing the spaced apart flute positionment and axially gradually tapered flute configuration, radially inwardly of a cutting edge portion of the third embodiment of this invention.
Figure 20:
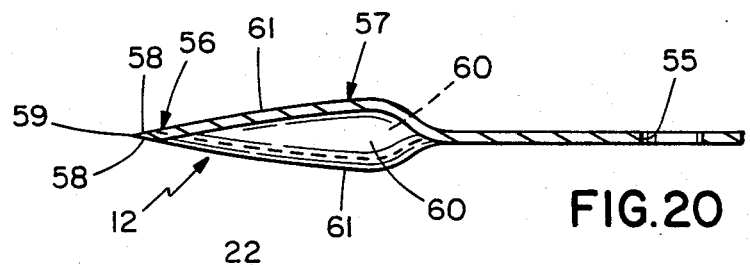
FIG. 20 is a partial sectional view taken along line 20—20 of FIG. 19 of the embodiment of the invention illustrated in FIG. 19 showing the gradually axially tapered configuration of the flutes positioned radially inwardly from the cutting edge portion thereof.
Figure 21:
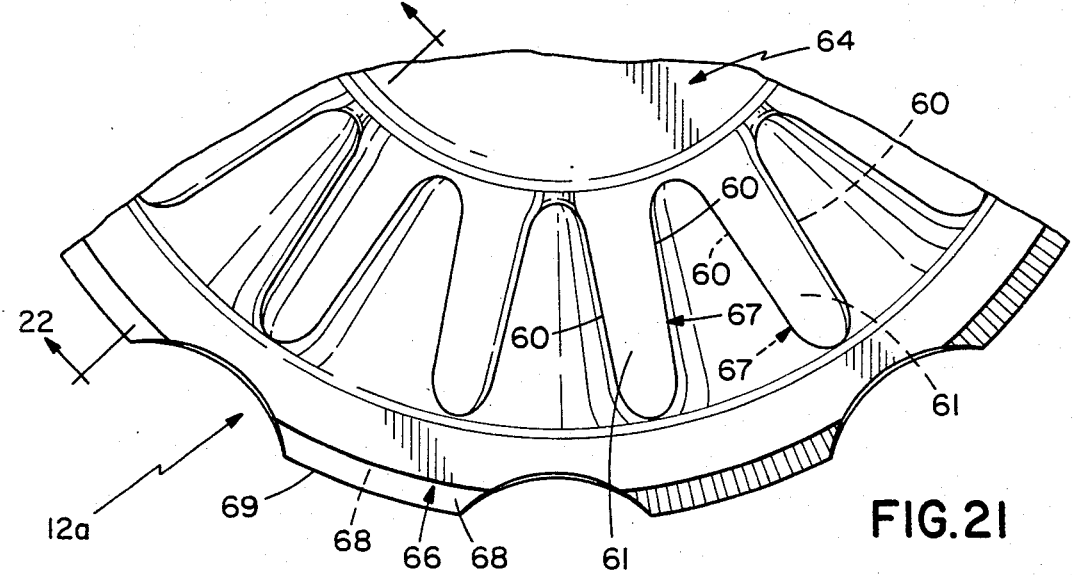
FIG. 21 is a partial plan view of the improved coulter disc of this invention showing a variation of the third embodiment of this invention with the gradually axially tapered flutes thereof radially spaced inwardly and apart from the cutting edge portion, and showing the wide and shallow sharpened notches through the cutting edge portion.
Figure 22:
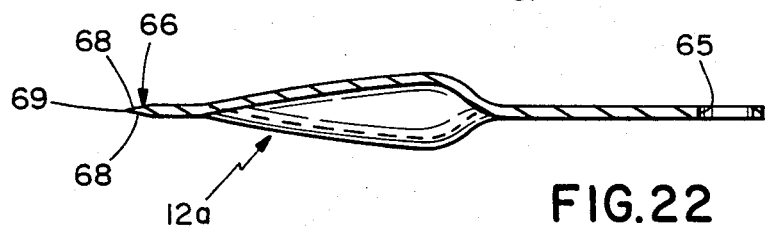
FIG. 22 is a partial section view taken along line 22—22 of FIG. 21 of the embodiment of the invention shown in FIG. 21 illustrating the gradually axially tapered configuration of the flutes positioned radially inwardly from the cutting edge portion thereof.
Figure 23:
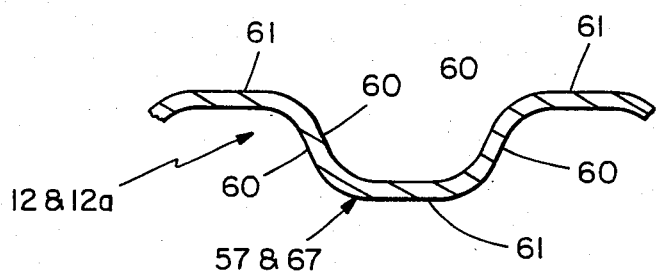
FIG. 23 is a sectional view taken along line 23—23 of FIG. 19 showing the largest axial dimension and smallest circumferential dimension of the flutes of the third embodiment of this invention.
Figure 24:
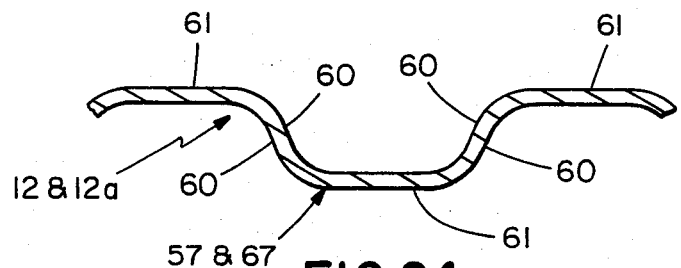
FIG. 24 is a sectional view taken along line 24—24 of FIG. 19 showing the initial axially tapered dimension of the flutes of the third embodiment of this invention.
Figure 25:
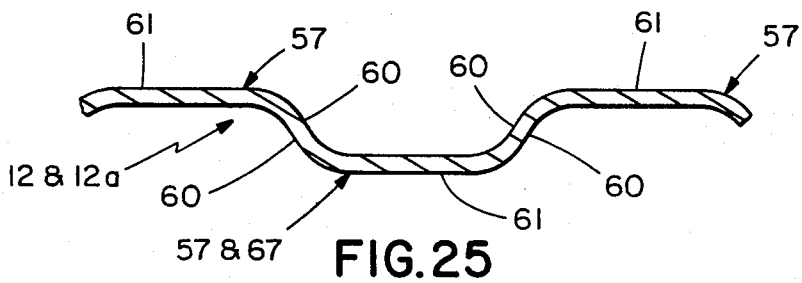
FIG. 25 is a sectional view taken along line 25—25 of FIG. 19 showing a further axially tapered dimension of the flutes of the third embodiment of this invention.
Figure 26:
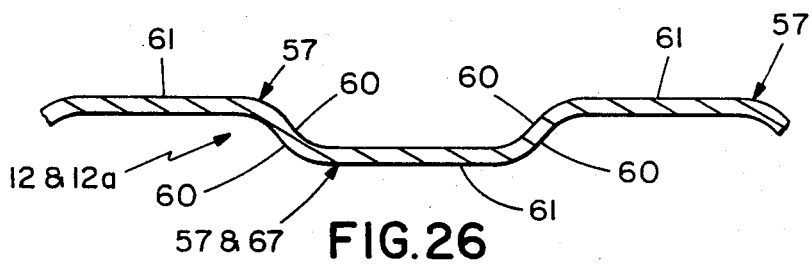
FIG. 26 is a sectional view taken along line 26—26 of FIG. 19 showing a further axially tapered dimension of the flutes of the third embodiment of this invention.
Figure 27:
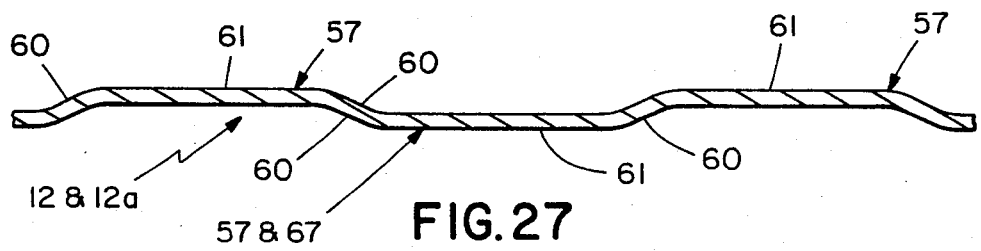
FIG. 27 is a sectional view taken along line 27—27 of FIG. 19 showing a further axially tapered dimension and circumferentially largest dimension of the flutes of the third embodiment of this invention and radially immediately inward from the termination of said flutes spaced inwardly from the cutting edge portion of the coulter blade.
Figure 28:
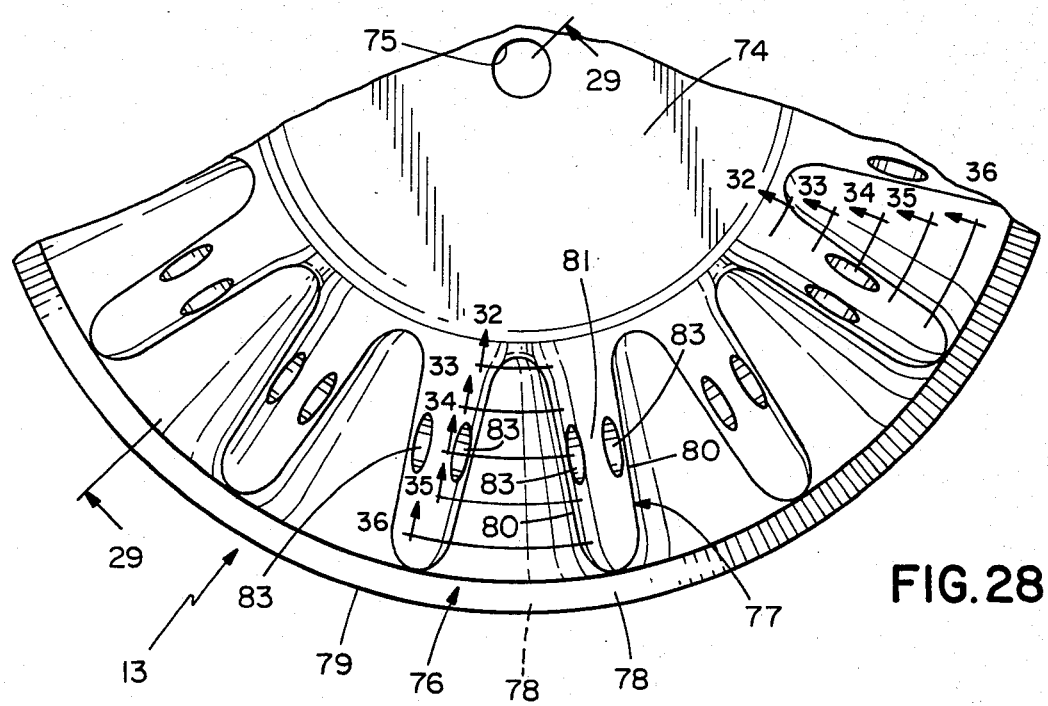
FIG. 28 is a partial plan view of a fourth embodiment of the improved coulter disc of this invention showing the spaced apart flute positionment and gradually tapered flute configuration, radially inwardly of a cutting edge portion of the fourth embodiment of this invention showing circumferential openings through the flutes thereof.
Figure 29:
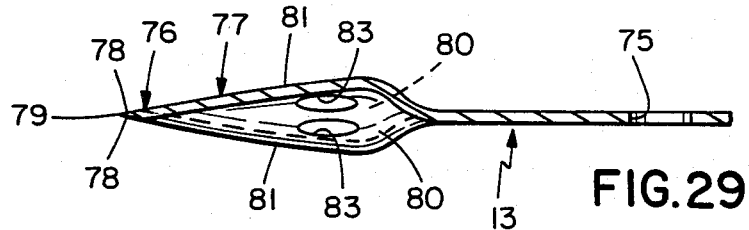
FIG. 29 is a partial sectional view taken along line 29—29 of FIG. 29 of the embodiment of the invention illustrated in FIG. 29 showing the axially tapered configuration of the flutes positioned radially inwardly from the cutting edge portion thereof.
Figure 30:
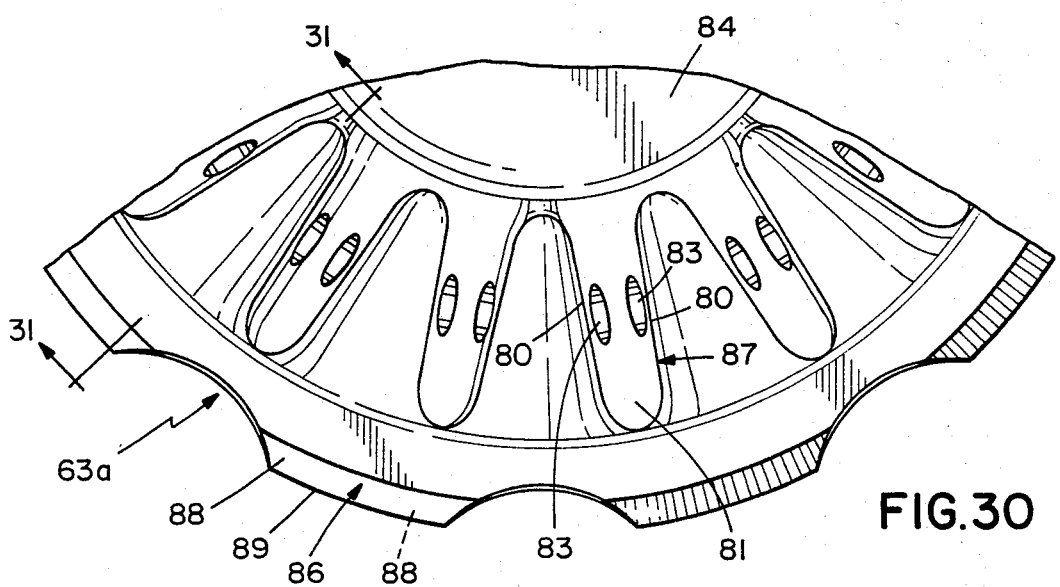
FIG. 30 is a partial plan view of the improved coulter disc of this invention showing a variation of the fourth embodiment of this invention with the identical flutes thereof radially spaced inwardly and apart from the cutting edge portion, and showing the wide and shallow sharpened notches through the cutting edge portion.
Figure 31:
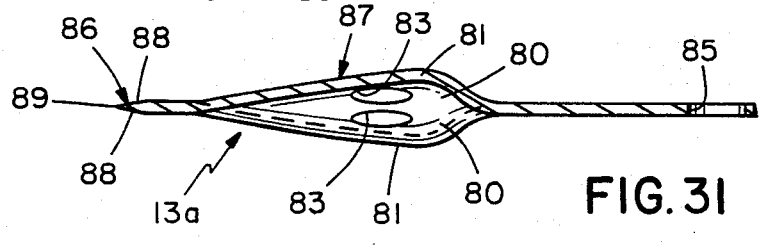
FIG. 31 is a partial section view taken along line 31—31 of FIG. 30 of the embodiment of the invention shown in FIG. 30 illustrating the axially tapered configuration of the flutes positioned radially inwardly from the cutting edge portion thereof.
Figure 32:
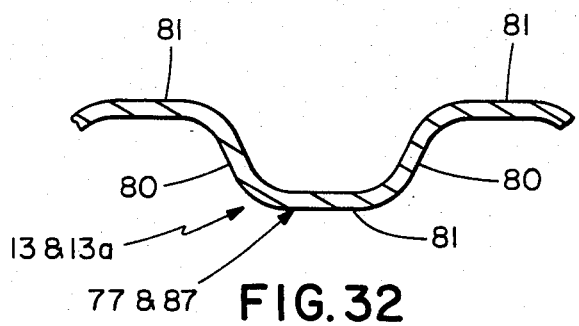
FIG. 32 is a sectional view taken along line 32—32 of FIG. 28 showing the largest axial dimension and smallest circumferential dimension of the flutes of the fourth embodiment of this invention.
Figure 33:
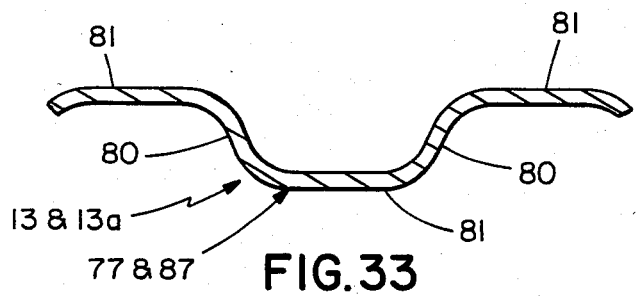
FIG. 33 is a sectional view taken along line 33—33 of FIG. 28 showing the initially axially tapered dimension of the flutes of the fourth embodiment of this invention.
Figure 34:
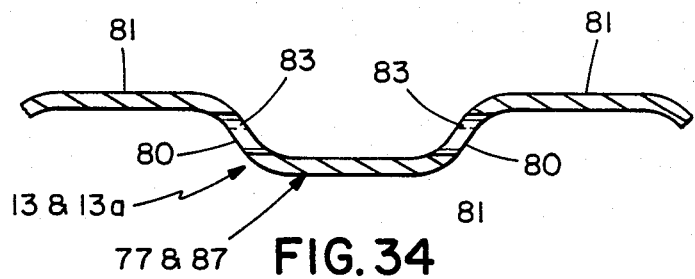
FIG. 34 is a sectional view taken along line 34—34 of FIG. 28 showing a further axially tapered dimension of the flutes of the fourth embodiment of this invention.
Figure 35:
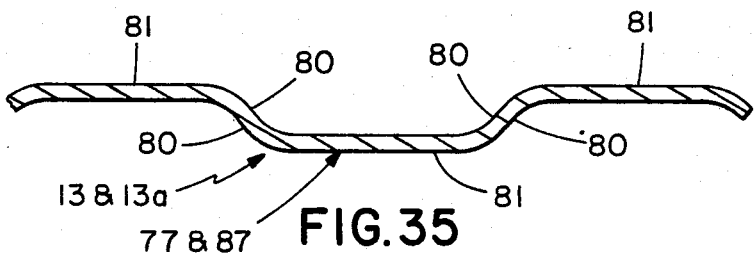
FIG. 35 is a sectional view taken along line 35—35 of FIG. 28 showing a further axially tapered dimension of the flutes of the fourth embodiment of this invention.
Figure 36:
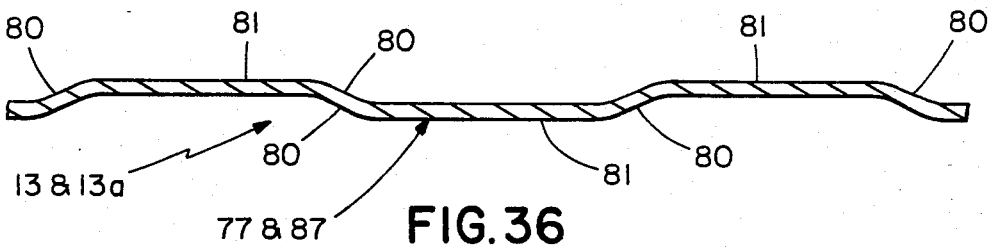
FIG. 36 is a sectional view taken along line 36—36 of FIG. 28 showing a further axially tapered dimension and circumferentially largest dimension of the flutes of the fourth embodiment of this invention and radially immediately inward from the termination of said flutes, or spaced inwardly from the cutting edge portion of the coulter blade.

Optionally, if the curved fluted coulter blade embodiments of FIGS. 10 and 12 were mounted so as to provide the clockwise rotation by movement to the right (FIGS. 12 and 14) into engagement with the soil, the curved flutes 37 and 47 would present a flatter outer portion of surface 40 into engagement with the soil during penetration by the disc, and would lessen the tendency for penetration. Thus, by optionally mounting this embodiment (FIGS. 10 and 12), in either the counterclockwise or clockwise position, the operational penetration characteristics from a single disc could be optionally alternately varied or changed from an efficient insertion penetration of flutes to a more resistive flute penetration respectively.

The fluted configuration of embodiments of discs 57 and 67 (FIGS. 19 and 21), provides a less circumferentially tapered configuration, while maintaining the axial taper. This provides a modified operation penetration to somewhat impede the penetration that would otherwise be available by the embodiment of FIGS. 1 and 3 or a clockwise utilization of embodiments of FIGS. 10 and 12, but provides a more efficient penetration than the clockwise utilization of the embodiments of FIGS. 10 and 12, all within the greater penetration capability of the improved coulter of this invention.

In addition thereto, the embodiments of flutes 77 and 87 (FIGS. 28 and 30) additionally provide an operational working of the soil and reduction of the potential clogging of the fluted areas by soil being forced through circumferential openings 83 thereof, and against any potential clog to urge the clogging from within the fluted areas of the coulter blade of this invention.

It is to be understood that the invention is not to be limited to the specific constructions and arrangements shown and described, as it will be understood to those skilled in the art that certain changes may be made without departing from the principles of the invention.

What is claimed is:

1. An improved coulter blade comprising a disc plate body having a radially tapered circumferentially straight cutting edge portion on the peripheral extremity thereof, flutes circumferentially spaced apart around said plate, said flutes being radially elongated and positioned radially inwardly from said cutting edge portion, said flutes being axially and circumferentially diminishingly tapered along substantially the entire length thereof to be smaller toward said cutting edge portion.

2. An improved coulter blade as defined in claim 1 wherein said flute are radially tapered along the length thereof toward said cutting edge portion.

3. An improved coulter blade as defined in claim 1 wherein said flutes have the radially outward extremity thereof adjacent the inward side of said cutting edge portion.

4. An improved coulter blade as defined in claim 1 wherein said flutes have the radially outward extremity thereof spaced inwardly from the inward side of said cutting edge portion.

5. An improved coulter blade as defined in claim 1 wherein said cutting edge portion has radial notches therethrough at circumferentially spaced apart positions.

6. An improved coulter blade as defined in claim 5 wherein said notches have a circumferential length greater than the radial depth thereof.

7. An improved coulter blade as defined in claim 5 wherein said notches have circumferential length to radial depth ratio of three to one or greater.

8. An improved coulter blade as defined in claim 1 wherein said flutes are arcuately shaped in the radial direction.

9. An improved coulter blade as defined in claim 8 wherein said flutes are radially tapered along the length thereof toward said cutting edge portion.

10. An improved coulter blade as defined in claim 8 wherein said flutes have the radially outward extremity thereof adjacent the inward side of said cutting edge portion.

11. An improved coulter blade as defined in claim 8 wherein said flutes have the radially outward extremity thereof spaced inwardly from the inward side of said cutting edge portion.

12. An improved coulter blade as defined in claim 8 wherein said cutting edge portion has radial notches therethrough at circumferentially spaced apart positions.

13. An improved coulter blade as defined in claim 8 wherein said notches have a circumferential length greater than the radial depth thereof.

14. An improved coulter blade as defined in claim 8 wherein said notches have circumferential length to radial depth ratio of three to one or greater.

15. An improved coulter blade as defined in claim 1 wherein said flutes are radially tapered along the length thereof toward the center of said plate.

16. An improved coulter blade as defined in claim 15 wherein said flutes have the radially outward extremity thereof adjacent the inward side of said cutting edge portion.

17. An improved coulter blade as defined in claim 15 wherein said flutes have the radially outward extremity thereof spaced inwardly from the inward side of said cutting edge portion.

18. An improved coulter blade as defined in claim 15 wherein said cutting edge portion has radial notches therethrough at circumferentially spaced apart positions.

19. An improved coulter blade as defined in claim 15 wherein said notches have a circumferential length greater than the radial depth thereof.

20. An improved coulter blade as defined in claim 15 wherein said notches have circumferential length to radial depth ratio of three to one or greater.

21. An improved coulter blade as defined in claim 15 wherein said flutes have openings circumferentially therethrough.

22. An improved coulter blade as defined in claim 15 wherein said flutes have the radially outward extremity thereof adjacent the inward side of said cutting edge portion.

23. An improved coulter blade as defined in claim 15 wherein said flutes have the radially outward extremity thereof spaced inwardly from the inward side of said cutting edge portion.

24. An improved coulter blade as defined in claim 15 wherein said cutting edge portion has radial notches therethrough at circumferentially spaced apart positions.

25. An improved coulter blade as defined in claim 15 wherein said notches have a circumferential length greater than the radial depth thereof.

26. An improved coulter blade as defined in claim 15 wherein said notches have circumferential length to radial depth ratio of three to one or greater.

27. An improved coulter blade as defined in claim 1 wherein said flute axial taper is in the range of 14 to 21 degrees.

28. An improved coulter blade as defined in claim 4 wherein said flute axial taper is in the range of 14 to 21 degrees.

29. An improved coulter blade as defined in claim 8 wherein said flute axial taper is in the range of 14 to 21 degrees.

* * * * *

UNITED STATES PATENT AND TRADEMARK OFFICE
CERTIFICATE OF CORRECTION

PATENT NO. : 4,538,688

DATED : September 3, 1985

INVENTOR(S) : Robert J. Szucs & Sandra M. McNicholas

It is certified that error appears in the above-identified patent and that said Letters Patent is hereby corrected as shown below:

Column 4 Line 30 "initially" should be --initial--;

Column 5 Line 16 "27" should be --17--;

" " Line 52 "serially" should be --radially--;

" " Line 57 "12" should be --21--;

" " Line 67 "35" should be --36--;

Column 6 Line 37 "narror" should be --narrow--;

Column 7 Line 5 "are" should be --have--;

" " Line 7 "12" should be --21--;

" " Line 9 "FIGS." should be --FIG.--;

Column 9 Line 9 "flute" should be --flutes--.

Signed and Sealed this

Eighteenth Day of March 1986

[SEAL]

Attest:

DONALD J. QUIGG

Attesting Officer  Commissioner of Patents and Trademarks